(12) United States Patent
Rav-Acha et al.

(10) Patent No.: US 9,928,877 B2
(45) Date of Patent: *Mar. 27, 2018

(54) METHOD AND SYSTEM FOR AUTOMATIC GENERATION OF AN ANIMATED MESSAGE FROM ONE OR MORE IMAGES

(71) Applicant: MAGISTO LTD., Nes-Ziona (IL)

(72) Inventors: Alexander Rav-Acha, Rehovot (IL); Oren Boiman, Sunnyvale, CA (US)

(73) Assignee: MAGISTO LTD., Nes-Ziona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,875

(22) Filed: Feb. 2, 2016

(65) Prior Publication Data

US 2016/0217828 A1 Jul. 28, 2016

Related U.S. Application Data

(63) Continuation-in-part of application No. 14/538,361, filed on Nov. 11, 2014, now Pat. No. 9,324,374.
(Continued)

(51) Int. Cl.
*G11B 27/036* (2006.01)
*H04N 5/272* (2006.01)
*H04N 5/93* (2006.01)
*G11B 27/10* (2006.01)
*G06K 9/46* (2006.01)
(Continued)

(52) U.S. Cl.
CPC .......... *G11B 27/036* (2013.01); *G06K 9/4671* (2013.01); *G11B 27/031* (2013.01); *G11B 27/10* (2013.01); *G11B 27/28* (2013.01); *H04N 5/272* (2013.01); *H04N 5/9305* (2013.01)

(58) Field of Classification Search
CPC ........ H04N 5/2352; H04N 5/262; H04N 7/18; H04N 19/87; G11B 27/031; G11B 27/002; G11B 27/28; G06T 7/001
See application file for complete search history.

(56) References Cited

U.S. PATENT DOCUMENTS 9,324,374 B2 * 4/2016 Rav-Acha ............ G11B 27/031
2011/0218997 A1 9/2011 Boiman et al.
(Continued)

OTHER PUBLICATIONS

Carsten Rother, Sanjiv Kumar, Vladimir Kolmogorov and Andrew Blake, Digital Tapestry, CVPR 2005.
(Continued)

*Primary Examiner* — Huy T Nguyen
(74) *Attorney, Agent, or Firm* — Pearl Cohen Zedek Latzer Baratz LLP

(57) ABSTRACT

A method and a system for automatically generating a video clip from one or more still images are provided herein. The method includes: obtaining one or more images containing at least one object over a background; detecting at least one object in the one or more images; deriving one or more relationships between at least two of: the background, the at least one object, or a portion thereof; determining, based on the derived one or more relationships, a spatio-temporal arrangement of at least two of: at least one portion of said one or more images, the at least one detected object, or a portion thereof; and producing a clip based on the determined spatio-temporal arrangement. The system may implement the method over a smartphone platform.

26 Claims, 13 Drawing Sheets

Related U.S. Application Data

(60) Provisional application No. 61/902,307, filed on Nov. 11, 2013, provisional application No. 62/110,651, filed on Feb. 2, 2015.

(51) Int. Cl.
*G11B 27/031* (2006.01)
*G11B 27/28* (2006.01)

(56) References Cited

U.S. PATENT DOCUMENTS

2011/0242130 A1   10/2011   Toba
2014/0241612 A1    8/2014   Rehmann et al.

OTHER PUBLICATIONS

Paul Viola and Michael Jones, Robust Real-time Object Detection, IJCV 2001.

Navneet Dalal, Bill Triggs and Cordelia Schmid, Human detection using oriented histograms of flow and appearance, ECCV 2006, pp. 428-441.

Jamie Shotton, John Winn, Carsten Rother and Antonio Criminisi, TextonBoost, Joint Appearance, Shape and Context Modeling for Multi-Class Object Recognition and Segmentation in European Conference on Computer Vision (2006), pp. 1-15.

W. Zhao, R. Chellappa, A. Rosenfeld and P.J. Phillips, Face Recognition: A Literature Survey, ACM Computing Surveys, 2003, pp. 399-458.

M. Irani and S. Peleg, Motion Analysis for Image Enhancement: Resolution, Occlusion, and Transparency . Journal of Visual Communication and Image Representation, vol. 4, No. 4, pp. 324-335, Dec. 1993.

M. Turk, A. Pentland, Eigenfaces for Recognition, Journal of Cognitive Neurosicence, vol. 3, No. 1, 1991, pp. 71-86.

Laurent Itti , Christof Koch and Ernst Niebur, A Model of Saliency-based Visual Attention for Rapid Scene Analysis, IEEE Transactions on Pattern Analysis and Machine Intelligence, vol. 20, pp. 1254-1259, Nov. 1998.

Kaminski Jeremy Yirmeyahu, Shavit Adi, Knaan Dotan and Mina Teicher, Head orientation and gaze detection from a single image, International conference of computer vision theory and applications. 2006.

Notice of Allowance dated Jan. 4, 2016 for corresponding U.S. Appl. No. 14/538,361, filed Nov. 11, 2014.

Mikolajczyk Krystian et al; Multiple Object Class Detection with a Generative Model; CVPR'06—Proceedings of the 2006 IEEE Computer Society Conference on Computer Vision and Pattern Recognition—vol. 1; pp. 26-36; Washington DC , USA, Jun. 17-22, 2006.

Xin Li et al; Latent Semantic Representation Learning for Scene Classification; Department of Computer and Information Sciences, Temple University, Philadelphia, PA 19122, USA; ICML'14 Proceedings of the 31st International Conference on International Conference on Machine Learning—vol. 32; pp. 11-532-11-540 ; Beijing, China—Jun. 21-26, 2014.

Monay Florent et al; Plsa-based image auto-annotation: constraining the latent space; Proceedings of the 12th annual ACM international conference on Multimedia pp. 348-351; New York, NY, USA—Oct. 10-16, 2004.

Yung-Yu, Chuang et al; Animating Pictures with Stochastic Motion Textures; ACM Transactions on Graphics, vol. 24, No. 3, to appear, Proceedings of ACM SIGGRAPH 2005, Jul. 2005, Los Angeles.

Yuan, Lu et al; Image deblurring with blurred/noisy image pairs; SIGGRAPH '07 ACM SIGGRAPH 2007 papers; vol. 26 Issue 3, Jul. 2007.

\* cited by examiner

METHOD AND SYSTEM FOR AUTOMATIC GENERATION OF AN ANIMATED MESSAGE FROM ONE OR MORE IMAGES

CROSS-REFERENCE TO RELATED APPLICATIONS

This application claims the benefit of U.S. Provisional Patent Application No. 62/110,651, filed on Feb. 2, 2015, and is also a Continuation-in-Part of U.S. patent application Ser. No. 14/538,316, filed on Nov. 11, 2014, which claimed priority from U.S. Provisional Patent Application No. 61/902,307, filed on Nov. 11, 2013, all of which are incorporated herein by reference in their entirety.

FIELD OF THE INVENTION

The present invention relates generally to computer vision, and more particularly, to employing computer vision techniques in generating clips from one or more images.

BACKGROUND OF THE INVENTION

Prior to the background of the invention being set forth, it may be helpful to set forth definitions of certain terms that will be used hereinafter.

The term "object" as used herein is defined as an entity in an image (e.g. a photo), or set of images, that corresponds to a real object in the world, e.g. a person, pet or even an inanimate object as a car. Therefore, a single person that is recognized in multiple images will be considered as a single object, having several instances.

In recent years, photos became one of the main elements in people's communication and social networking platforms. For example™Instagram, which is a photos-based social network, or the sharing of photos in the mobile application WhatsUp™ and the like. These photos are frequently used for messaging and expressing emotions.

As smartphones with cameras become ubiquitous, people take photos on a daily basis. A compelling way to view these images is by creating a music clip from them. However, the process of editing the images and providing a soundtrack is both time consuming and requires editing knowledge. One of the most important challenges is to order the photos or the images in such a way that will "tell a story" rather than an otherwise an image or an unarranged sequence of images.

It would be advantageous to use the computing power of a computer for making the decisions of the ordering and arrangement of the captured images, to create a clip that will be interesting to watch in the sense of a "story told" by the clip.

SUMMARY OF THE INVENTION

Embodiments of the present invention provide an automatic creation of a "moving message", which is essentially a short video-clip, from one or more photos plus a corresponding textual message. The creation of the moving message is done as a function of the content of the input photo, which is obtained using a visual analysis of the photo (and optionally depends also on a joint semantic analysis of the photo and the text message). The creation of the moving message aims to improve the massaging and boost the emotions that are invoked by the photo and the text message.

According to some embodiments of the present invention, a method generating an animated message from one or more still images is provided herein. The method may include: obtaining one or more images containing at least one object over a background; detecting at least one object in the one or more images; deriving one or more relationships between at least two of: the background, the at least one object or a portion thereof; determining, based on the derived one or more relationships, a spatio-temporal arrangement of at least two of: at least one portion of said image, the at least one detected object or a portion thereof; and producing a clip based on the determined spatio-temporal arrangement.

According to some embodiments of the present invention, the music clip may be generated by optimizing a cost function (denoted as the "inter-object relationships" score) which takes into account the relations between the different objects that were detected in the image, and various framing options in which these objects can be displayed.

These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
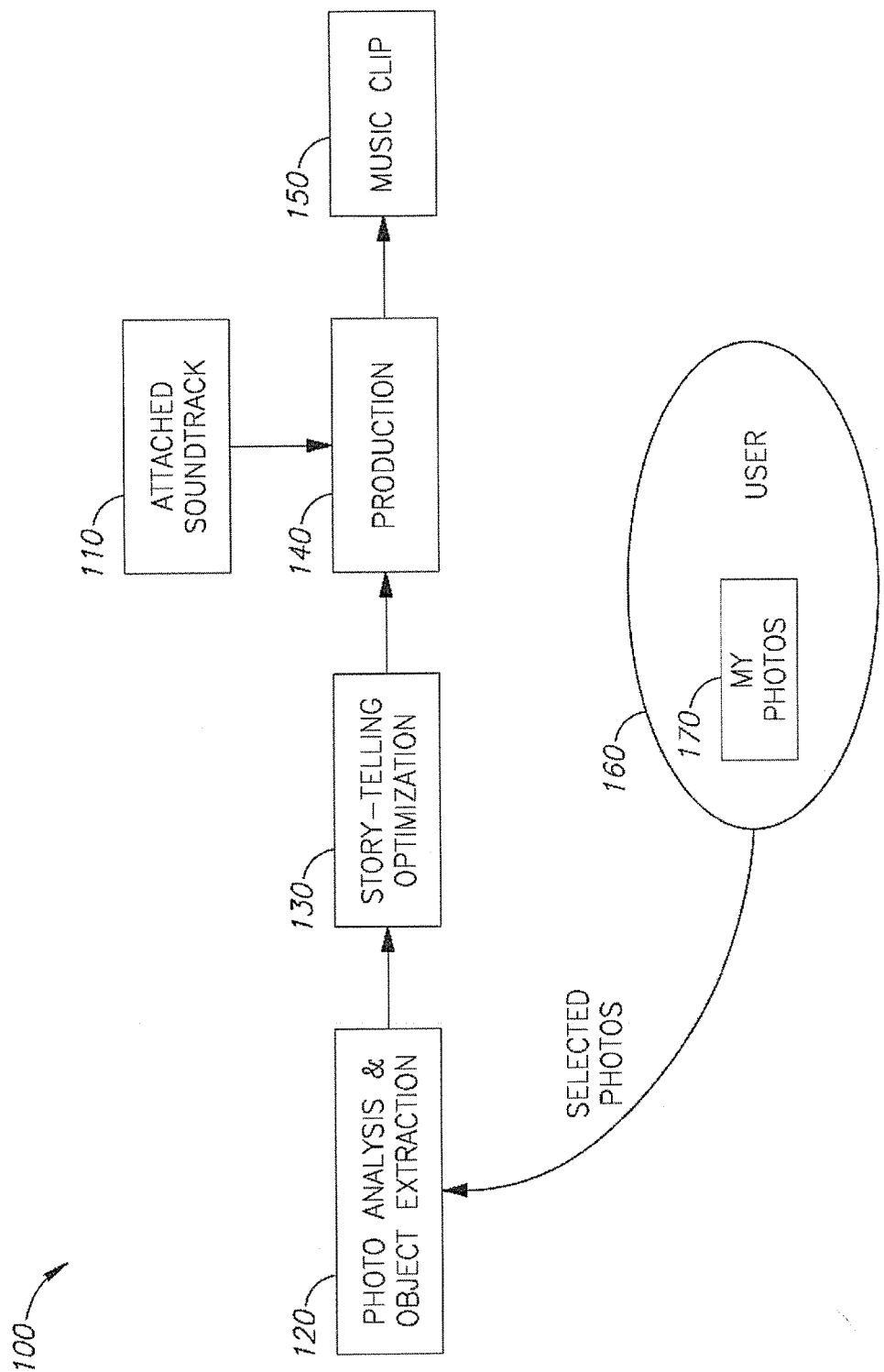
FIG. 1 is a schematic block diagram illustrating a system according to embodiments of the present invention.

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before at least one embodiment of the present technique is explained in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

FIG. 1 is a block diagram illustrating a schematic flow of a system 100 in accordance with some embodiments of the present invention. System 100 may obtain one or more photos, usually 'my photos' 170 being a repository of photos taken by a user 160. The first element of system 100 is the photo-analysis and objects extraction module 120 possibly executed by a computer processor (not shown). In objects extraction module 120, the images are analyzed, and various objects such as people, pets or other types of objects are extracted.

The second element is the "story-telling" optimization module 130 which may also be referred as "inter-object relationships" optimization. In the "story-telling" optimization module 130, portions of the captured photos (hereinafter: images) may be organized in space and time to create a so-called narrative being a sequence of occurrences of one or more contexts. The organization of the objects and image portions may be based on an analysis of the objects extracted in the first block, and is may be carried out by optimizing a so-called "inter-object relationships" score function. An example for a component in the inter-object relationships score function is the level of continuity in the objects: For example, two image portions will get a high score for being shown sequentially if they apply different cropping operations of the same object. Other exemplary components of the inter-object relationships score function will be detailed herein.

The third element (being optional) is the production module 140. Production module 140 is responsible for adding transitions and effects to the music clip 150, synchronizing the transitions and effects with the music (e.g.— synchronizing them to the beats of an attached soundtrack 110), stitching portions of images that will appear together in music clip 150, and the like.

Figure 2:
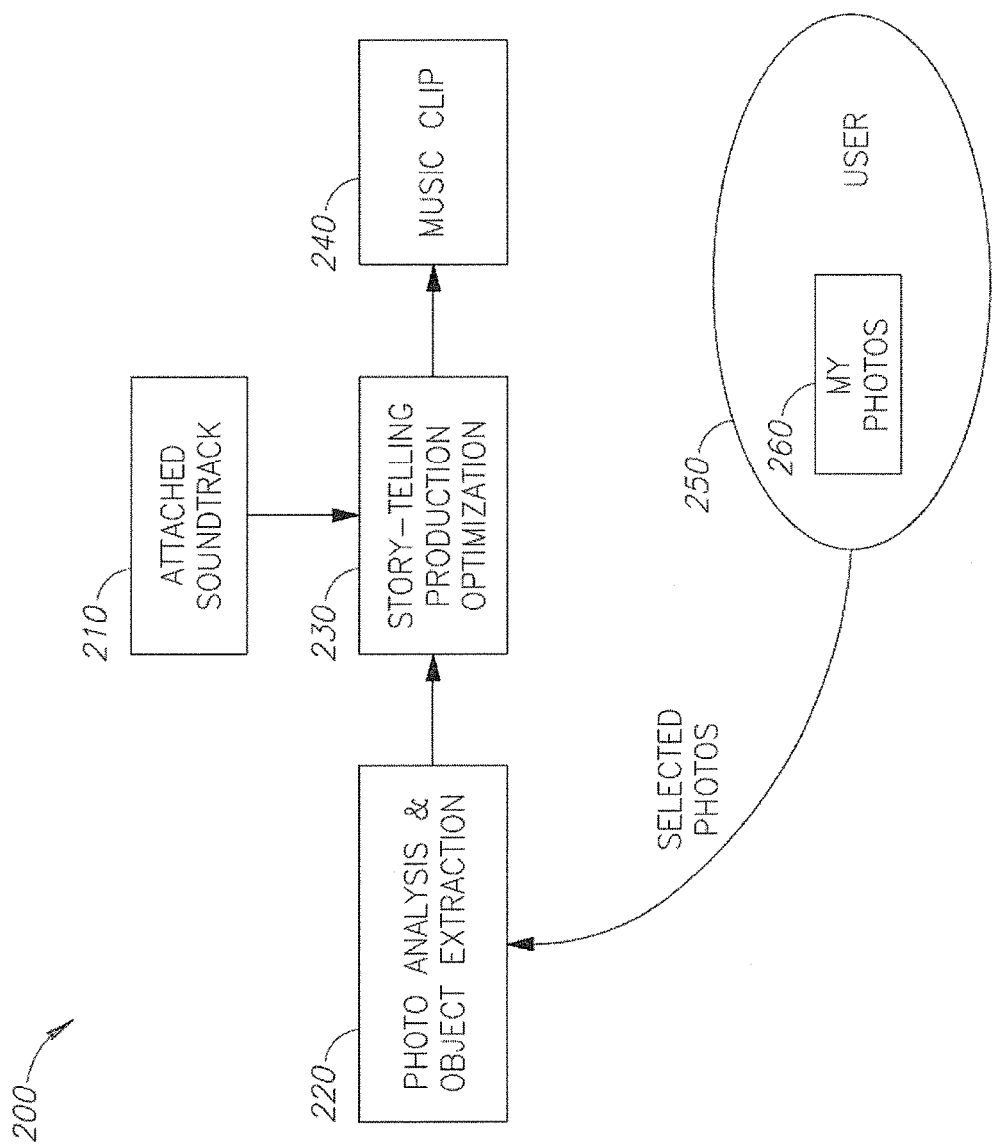
FIG. 2 is a schematic block diagram illustrating a system according to embodiments of the present invention.

FIG. 2 is a schematic block diagram illustrating an alternative implementation of a system 200 according to other embodiments of the present invention. Similarly to system 100, system 200 obtains selected photos from a 'my photos' repository 260 of a user 250. However, as shown here, the "story telling" optimization and the production modules may be unified to a single block 230, in which optimizing the inter-object relationships function and some production parameters (such as the synchronization to music) are carried out simultaneously. An attached soundtrack 210 may be then added to create a music clip 240.

Following below are more details on the photo-analysis object extraction module 220. An 'Object' may be defined herein an entity in an image, or set of images, that corresponds to a real object in the world, for example, a person, a pet or even an inanimate object such as a car. Therefore, a single person that is recognized in multiple images will be considered as a single object, having several object-instances. Formally, if two object-instances $O_1$ and $O_2$ correspond to the same object in the world (e.g.—images of the same person), it would be possible to state that object $(O_1)$=object $(O_2)$. However, for the sake of simplicity, "object-instances" may be referred herein as "objects", when it is clear that an object might have several instances in different images.

Usually the focus would be on extracting interesting objects only, for example, people and pets, and ignore objects that relate to the background such as trees, houses, and the like.

There are various known ways to extract objects from images. Following are described several such methods that can be used for this task:

Detecting a pre-determined class of objects, such as faces, is a well-known problem in computer vision, and there exist a large number of methods that addresses this problem. The detection can be done, for example, using pattern recognition algorithms known in the art for detecting faces, for detecting persons, or for detecting general pre-defined classes of objects. Optionally, an object can be manually indicated by the user, e.g.—by tapping on top of the camera's screen, where an instance of this object appears.

An object may correspond to a specific entity and not a general class, e.g.—a specific person. To common approach to detect a specific person is using general Face Detection followed by face recognition which identified the specific person.

Objects can also be detected without pre-defining them. For example, detecting objects based on saliency detection algorithms (assuming that the object is salient relative to the background).

In this section, an "inter-object relationships" score will be described in further details, whose optimization is used to determine the organization of the object-instances in the music clip. This is in contrast to a common approach for slide-show generation which simply displays the images in their original order (Either based on their capture times, or on the order of their selection by the user), and without cropping the images around objects according to some story telling criterions.

In the video editors and photographers communities, it is common to refer to different types of positioning of an object in a picture. There are various common positioning types, such as: Long-shot, Medium shot, Close-Up, Extreme-Close-Up, American, and the like. These types of positioning will be referred herein as "Framing" types, and will determine the framing of the objects in the output music clip as part of the inter-object relationships optimization. Given a positioning of an object in the frame, its "Framing" type is determine by the relationship between the size of the object and the size of the image in which it appears. For example, for the case of a person, the framing is usually determined by the ratio between the size of the face and the height of the region in the image bellow the face. A simple way to change the framing of an object is to use image cropping.

Figure 3:
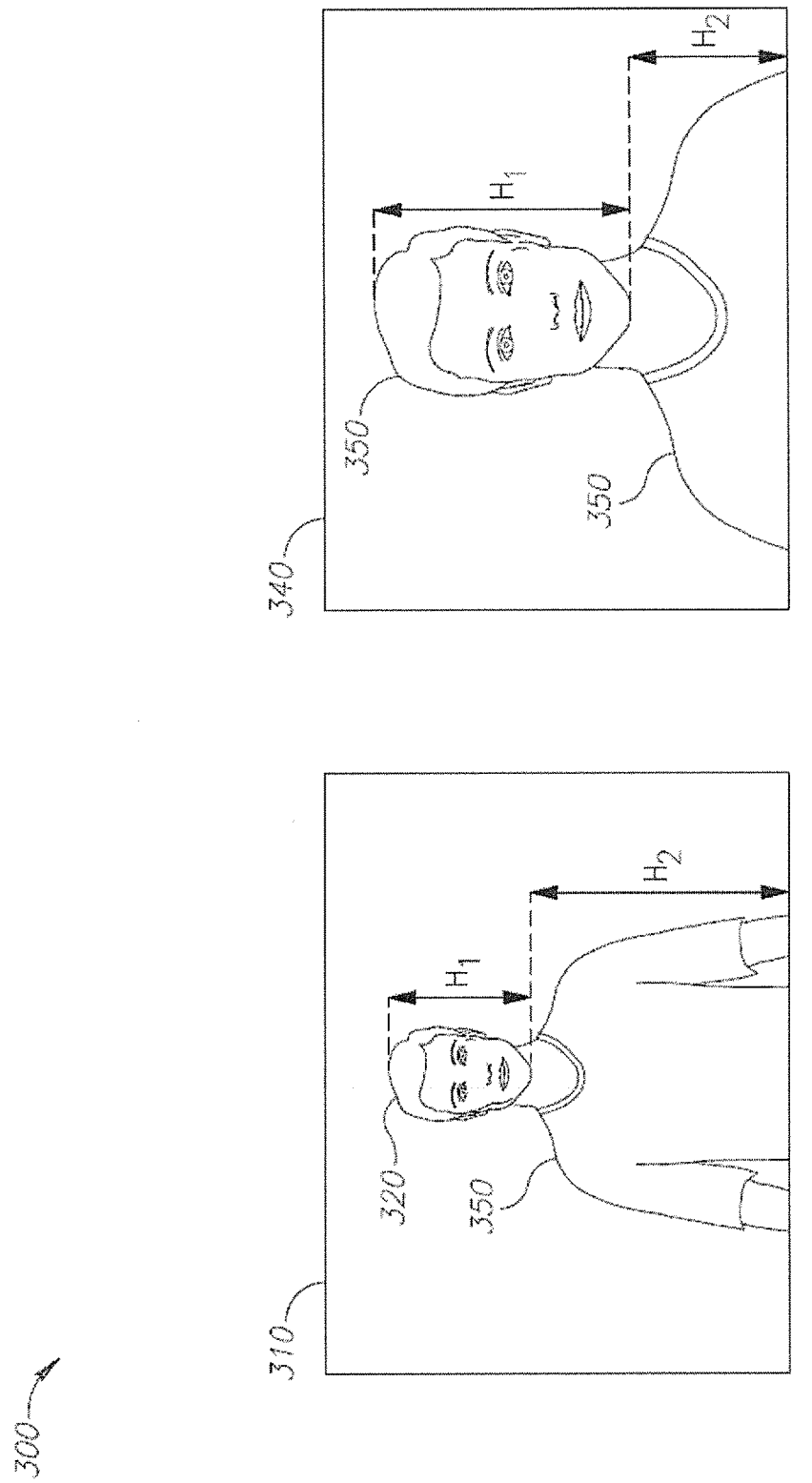
FIG. 3 is a diagram illustrating an aspect of the system in accordance with embodiments according to the present invention.

FIG. 3 is a diagram 300 illustrating an aspect of the system in accordance with embodiments according to the present invention. The figure demonstrates two framing types: Medium Shot 310 and Close-Up 340. One way to define a framing type for the case of a person is by comparing the ratio $H_1/H_2$ to pre-defined thresholds where $H_1$ related to the head 320 of the person and $H_2$ relates to the torso 350 of the same person. The framing for general objects can be defined, for example, based on the portion of the image captured by the object (e.g.—if it is big enough, it will be denoted as a "Close-Up", and the like).

As mentioned before, the Story-Telling optimization determines the organization of objects or parts of objects in the output video clip. In this section we define the space of possible object organizations over which we optimize the story-telling score.

Assume that there are K object-instances $\{O_1, \ldots, O_k\}$ detected in the images, and there is a pre-determined set of possible framing types $\{fr_1, \ldots fr_l\}$ such as 'Close-Up', 'Medium-Shot', and the like.

Figure 4:
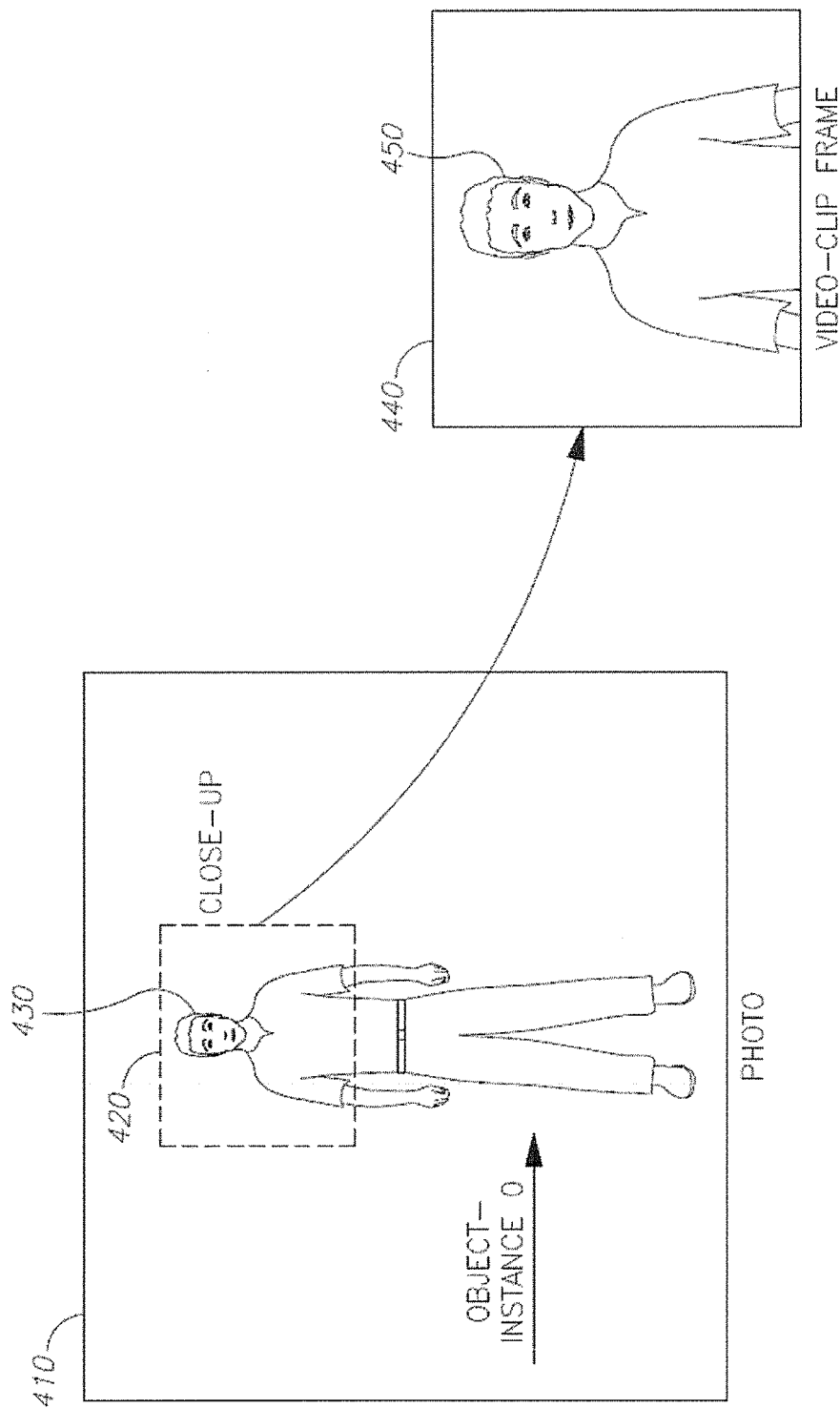
FIG. 4 is a diagram illustrating an aspect of the system in accordance with embodiments according to the present invention.

A reframing pair $P=(O_i, fr_j)$ may be defined as a pair of object-instance and a framing type: This pair refers to the fact that object-instance $O_i$ appears in the resulting video clip in framing $fr_j$ (which can be obtained, for example, by cropping the image accordingly). FIG. 4 demonstrates an actual implication of such a pair. Obviously, not all pairs of object-instances and framing types are possible: for example, an object that appears in the original image in a medium-shot, cannot appear in the video clip in long-shot. It should be noted that an object may be selected multiple times (including zero), possibly having different framings.

A special case for a reframing pair is the background (which can be considered as a special object), which may also be selected. Usually, the background is shown without cropping, and is considered as a Long-Shot framing (as the image is not focused on any specific object). Thus, images without any "foreground" object can also be displayed in the resulting clip. A relationship between the background object and a regular object may be "The object resides inside the scene corresponding to the background object".

FIG. 4 is a diagram 400 illustrating an aspect of the system in accordance with embodiments according to the present invention. FIG. 410 illustrates the implication of the pair (O,'Close-Up')—The object instance 0 is displayed in the video clip in a 'Close-Up' framing 440 taken by cropping 420 from image 410. Where only the head 420 of the user is extracted to be presented 450.

The Story Telling score aims to encourage states that "Tell a good story". This definition is very subjective, but there are objective rules and properties that can make a video clip feel as if it better tells a story, for example, by minimizing cuts between un-related objects.

Optimizing the story telling score gives a spatio-temporal arrangement of the objects, and respectively, a spatio-temporal arrangement of image portions that contains these objects or parts of objects.

By way of non-limiting illustration, several such objectives whose combination gives a Story Telling score will be described herein:

Preserving the Chronological Time

In one embodiment, the Story Telling score is penalized whenever the objects appear in the wrong chronological order as in Eq. (1) below:

$$E^{t\text{-}cont}(s_i, \ldots, s_n) = \sum_{\{i>j\}} \sum_{\{O_1 \text{ in } S_i, O_2 \text{ in } S_j\}} \begin{cases} f|t(O_1) - t(O_2)| & \text{if } t(O_1) < t(O_2) \\ 0 & \text{else} \end{cases} \quad \text{Eq. (1)}$$

Were $t(O)$ denotes the capture-time of the object instance O, and f is some cost function (e.g.-f can be constant 1). And wherein a state S is an ordered list of sets $(s_1, s_2, \ldots s_n)$, each $s_i$ being a set of reframing pairs. A desired length of the output video (based on user preferences, or based on the original number of images) may be defined, and penalizes states whose length differs from this length as in Eq. (2) below:

$$E^l(s_i, \ldots, s_n) = f(|l - l_0|) \quad \text{Eq. (2)}$$

Continuity

Where $t(O)$ is the desired length and f is some cost function (e.g.—square distance). It would be preferable to display multiple instances of the same object sequentially, rather than jumping between different objects: This can be formalized as in Eq. (3) below:

$$E^{object\text{-}cont}(s_i, \ldots, s_n) = \sum_i \sum_{\{O_1 \text{ in } S_i, O_2 \text{ in } S_{i+1}\}} \begin{cases} 0 & \text{if object}(O_1) = \text{object}(O_2) \\ 1 & \text{else} \end{cases} \quad \text{Eq. (3)}$$

Where $object(O_1) = object(O_2)$ means that $O_1$ and $O_2$ correspond to the same object in the real world.

Object Representation

It would be advisable to panelize objects that appear in the images but are not well represented in the output video clip. Eq. (4) below addresses this problem:

$$E^{rep}(s_i, \ldots, s_n) = \Sigma_{Obj \in \{detected\ object\}} W(Obj) \text{ if Obj not in } S_i \quad \text{Eq. (4)}$$

It is usually advisable to make a continuous selection of framing around consecutive objects in time. For example— moving from Close-Up to Close-Up, or from Medium-Shot to Medium-Shot (General transition cost can be defined between each pair of framing options). This cost may be denoted as $E^{framing\text{-}cont}$, where W(Obj) is the importance of the object. The importance of an object can be determined manually by the user, or automatically estimated based on various parameters (e.g.—people are more important than pets, objects with many instances are more important than object having only a few instances). In an optional implementation, the representativeness can depend also on the framing in which the object appears (e.g.—a Close-Up framing receives a better representation score than a Long-Shot).

It some embodiment, each object instance is forced to appear at least once in the output video. Sometimes it is desirable to place two objects in the same frame, if they refer to each other (i.e.—they are strongly related). For example—two people that are looking on each other, speaking to each other, doing a similar activity, are nearby in space or time, and the like. Eq. (5) below illustrates it:

$$E^{relevance}(s_i, \ldots, s_n) = \sum_i \sum_{\{O_1, O_2 \text{ in } S_i\}} \begin{cases} 0 & \text{if refer}(O_1, O_2) = 1 \\ 1 & \text{else} \end{cases} \quad \text{Eq. (5)}$$

where refer($O_1$,$O_2$) is an indicator whether $O_1$ and $O_2$ refers to each other (i.e.—are strongly related). Detecting that two objects refer to each other can be done, for example, based on gaze-estimation algorithms and checking if they are looking in the direction of each other, or by measuring there distance in which they appear in space-time.

Alternatively, common cinema editing approach prefer to tell the story by displaying the two objects in consecutive frames, preferably also passing throw a close-up framing. One such example can be based on Eq. (6)

$$E^{relevance}(s_i, \ldots, s_n) = \sum_i \sum_{\{O_1 \text{ in } S_i, O_2 \text{ in } S_{i+1}\}} \begin{cases} 0 & \text{if refer}(O_1, O_2) = 1 \\ 1 & \text{else} \end{cases} \quad \text{Eq. (6)}$$

The story telling score is a unification of all scores. A simple unification option is by summing them all in Eq. (7) below:

$$E^{story} = a \cdot E^{t\text{-}cont} + b \cdot E^t + c \cdot E^{object\text{-}cont} + d \cdot E^{rep} + e \cdot E^{framing\text{-}cont} + f \cdot E^{relevance} \quad \text{Eq. (7)}$$

where a, . . . ,f are constant weightings.

Other scores can be used, such as different types of continuity, scores that are relevant only to different parts of the edited video for example first set, and the like.

Optionally, appearance-based scores can also be used, for examples ones that encourage coherence in the appearance between objects that appear in the same frame. Such a score is described in the art for the problem of creating image tapestries (also denoted as "Image Collages"). In addition, packing considerations can also be used: e.g.—adding a score that avoids joining in the same set object-instances that cannot be packed together to the frame-size of the output video.

Optionally, the space-time arrangement may also deteimine the timing of each set in the output video clip (i.e.—the times in which each object-instance appears and disappears, or even the list of visual effects applied on this object-instance. In this case, the reframing pairs P=($O_i$, $fr_j$) are replaces with 4 tuples: P=($O_i$, $fr_j$, $t_{start}$, $t_{end}$), or 5-tuples: P=($O_i$, $fr_j$, $t_{start}$, $t_{end}$, e), where e is a list of visual effects (from a pre-determined pool of effects, such as different color filters, zoom-in, etc'). This case corresponds to the flow that was described in FIG. 2, i.e.—a combined optimization of Story-Telling and production 230.

The combined optimization of Story-Telling and production, requires as input also the attached soundtrack analysis (relating to the music that will be added to the output video clip), in order to synchronize the transition times (determined by ($t_{start}$, $t_{end}$)) to points of interest in the music, e.g.—beats and down beats.

In this block, the automatic video production of the selected objects is done. In the trivial implementation, object instances that were selected to appear at the same time (i.e.—belongs to the same set $s_i$ can be displayed together using a split screen, and each set is shown for a pre-determined amount of time.

However, the method can also provide a much more compelling automatically produced video clip. The automatic production makes use of a library of effects, transitions, graphic assets and sound tracks, which are determined according to the images and the Story-Telling organization. For instance, an algorithm can choose to use a face-morphing transition effect between two images, or add camera movements to each image. In addition, object instances that are shown together can be stitched in more compelling ways than simple split, e.g.—using an image collage technique known in the art.

The selection of transitions and effects may take into account the inter-object relationships. For example—applying certain transitions such as face-morphing only between instances of the same object or between multiple objects that refer to each other.

In addition, the production stage might correspond to synchronizing the transitions to the attached soundtrack (In the case that this synchronization was not done in the Story-Telling block)

Figure 5:
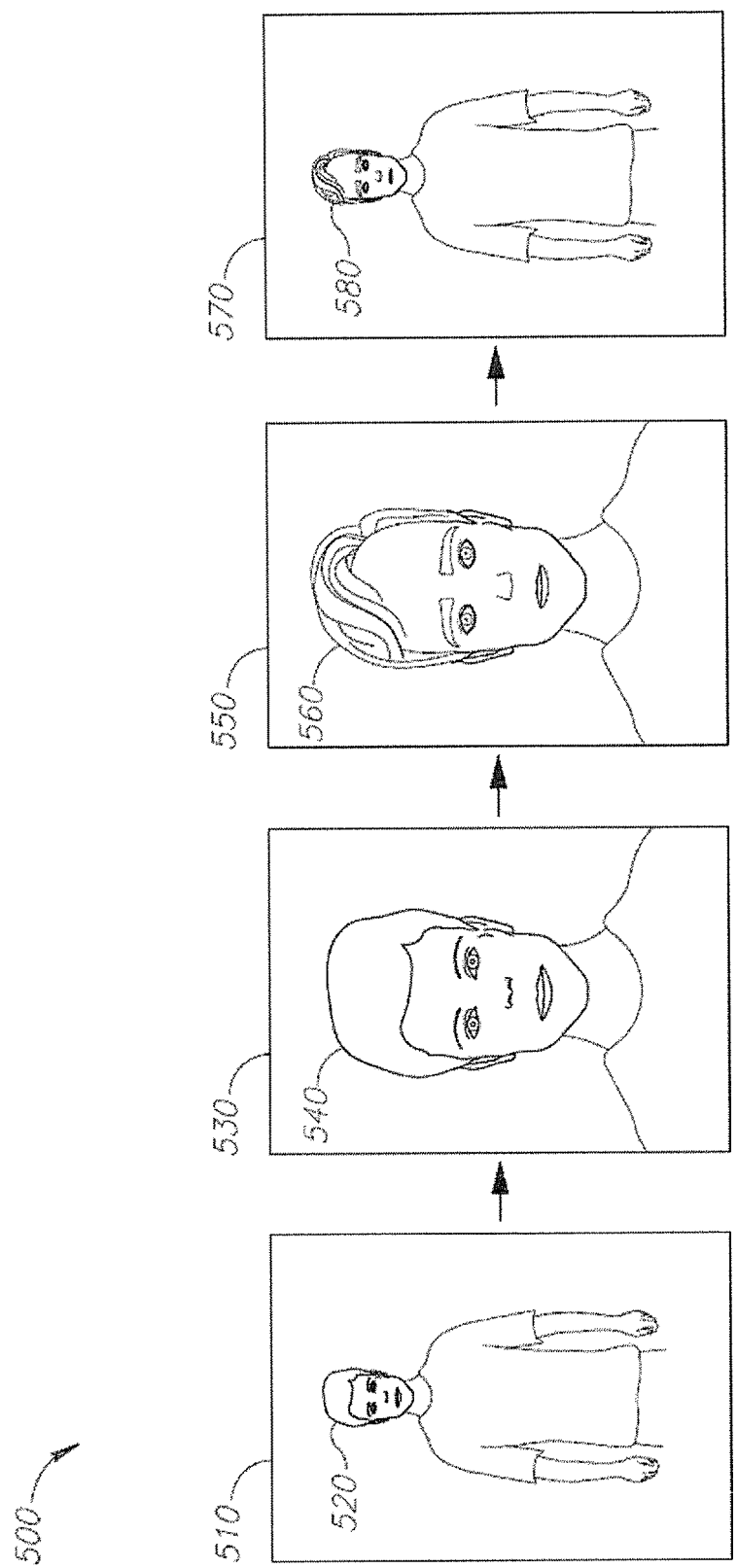
FIG. 5 is a diagram illustrating another aspect of the system in accordance with embodiments according to the present invention.

FIG. 5 is a diagram illustrating another aspect of the system in accordance with embodiments according to the present invention. Two objects (persons) were extracted and a relationship of communication has been detected between the, and so the inter-object function may provide scores accordingly. Thus, a sequence of cropping the original photo showing the two persons into a single photo 510 showing a long shot of person 520 may proceed to a close-up 530 showing a head shot 540 of the user. Then a close-up of the second person 560 is shown 550. This will represent in the clip the relationship of communication between the two persons as the head after head sequence infer a conversation taking place. Finally, a long shot photo 570 is being created of person 580 indicating that the communication session between the two persons is over.

Figure 6:
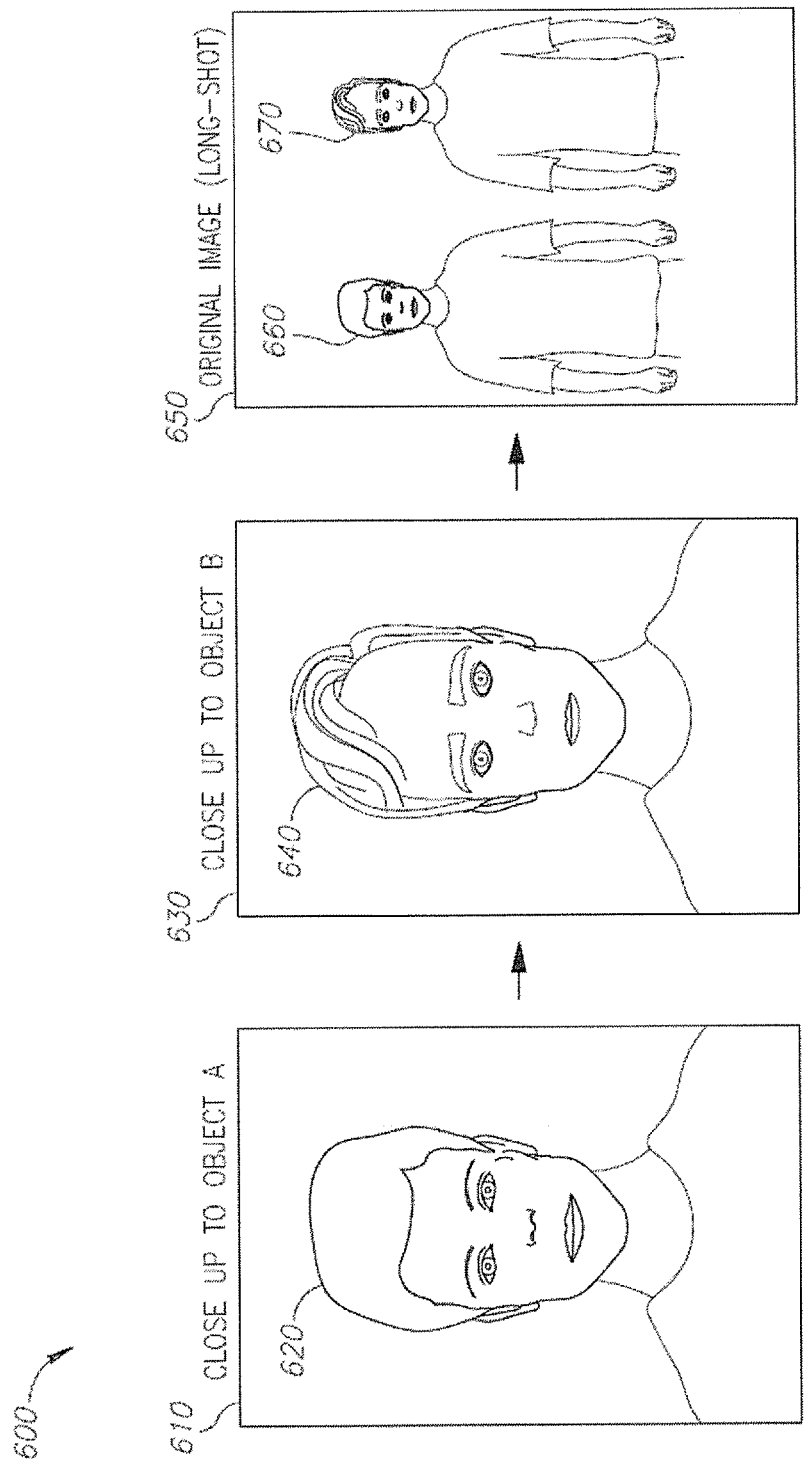
FIG. 6 is a diagram illustrating yet another aspect of the system in accordance with embodiments according to the present invention.

FIG. 6 is a diagram illustrating yet another aspect of the system in accordance with embodiments according to the present invention. An original photo 650 infers that the two persons 660 and 670 are related to each other (walking together, talking with each other and the like). Once this is detected, an artistic cinemascope editing sequence is carried out so that a close-up 610 on object A 620 is shown, then a close-up 620 of object B 670 is shown and only then the original photo 650 showing both person A 660 and person B 670 alike. In this sequence, some level of surprise to the viewer is achieved. The surprise occurs once it is revealed that both persons 660 and 670 are located physically next to each other. This surprise, according to cinemascope editing principles has an effect of an aesthetic value. The story telling function in one embodiment is affected by the concept of information theory according to which a repetitive sequence exhibit little information while a diverse, surprising sequence exhibits a high amount of information delivered. A story telling function providing high scores is therefore indicative of a tempo-spatial arrangement of objects that exhibit a high amount of information.

Figure 7:
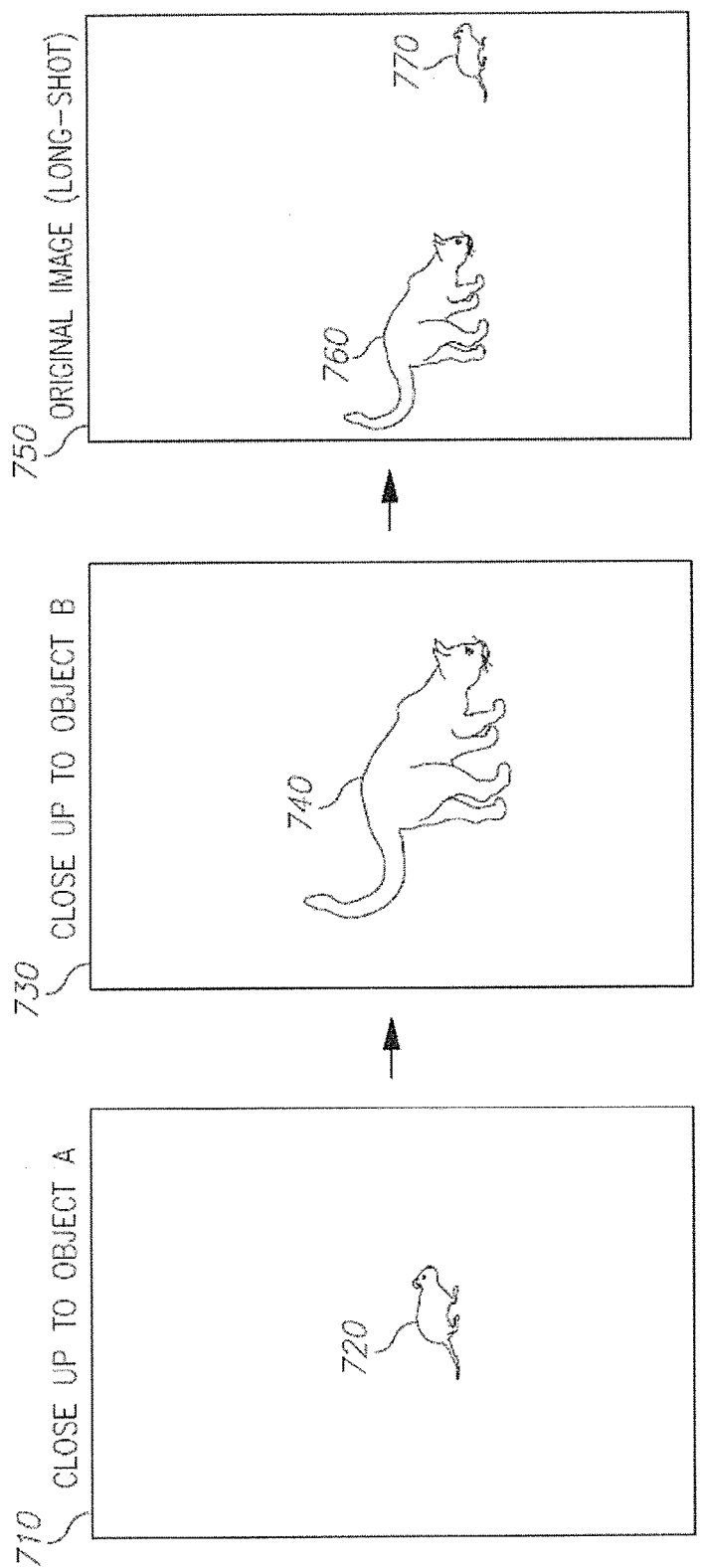
FIG. 7 is a diagram illustrating yet another aspect of the system in accordance with embodiments according to the present invention.

FIG. 7 is a diagram illustrating yet another aspect of the system in accordance with embodiments according to the present invention. An original photo 750 infers that a cat 760 chases a mouse 770 are related to each other in this manner. Once this is detected, an artistic cinemascope editing sequence is carried out so that a close-up 710 on mouse 720 is shown, then a close-up 730 of cat 740 is shown and only then the original photo 750 showing both cat 760 and mouse 770 engaged in the chase.

Figure 8:
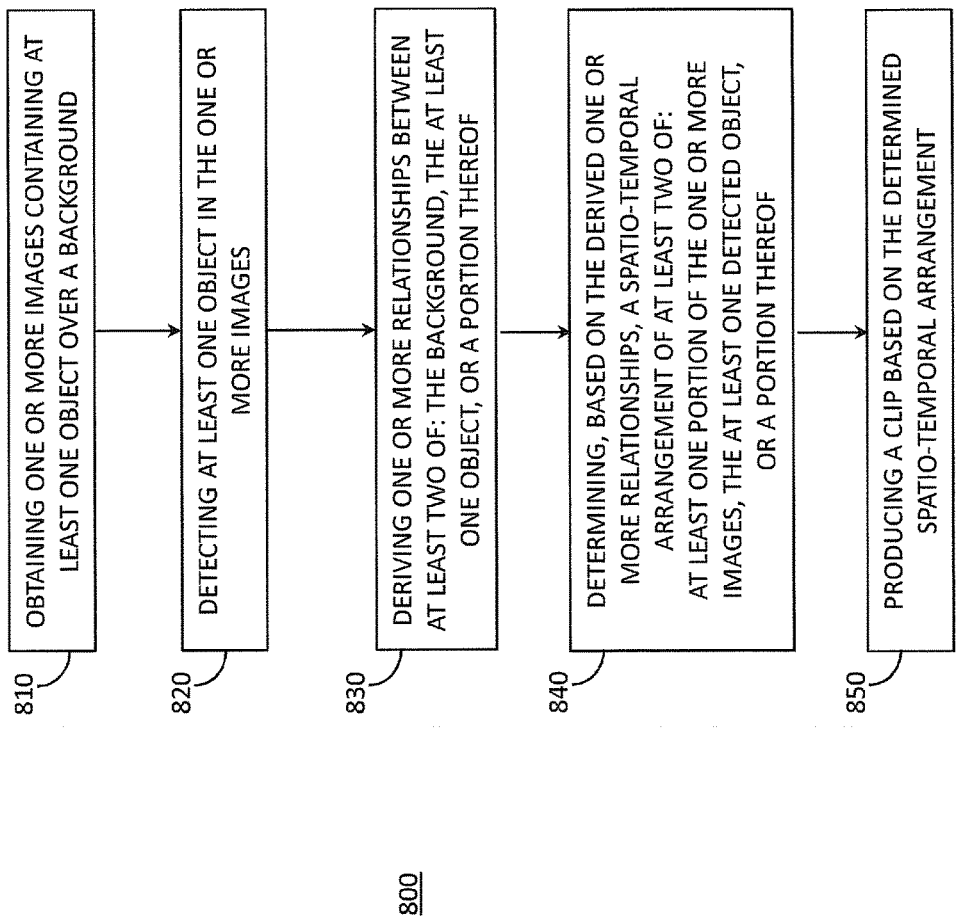
FIG. 8 is a flowchart diagram illustrating an aspect of the method in accordance with embodiments according to the present invention.

FIG. 8 is a flowchart diagram illustrating a generalized method implementing embodiments of the present invention. Method 800 may include: obtaining one or more images containing at least one object over a background

810; detecting at least one object in the one or more images 820; deriving one or more relationships between at least two of: the background, the at least one object or a portion thereof 830; determining, based on the derived one or more relationships, a spatio-temporal arrangement of at least two of: at least one portion of said image, the at least one detected object or a portion thereof 840; and producing a clip based on the determined spatio-temporal arrangement 850.

Figure 9:
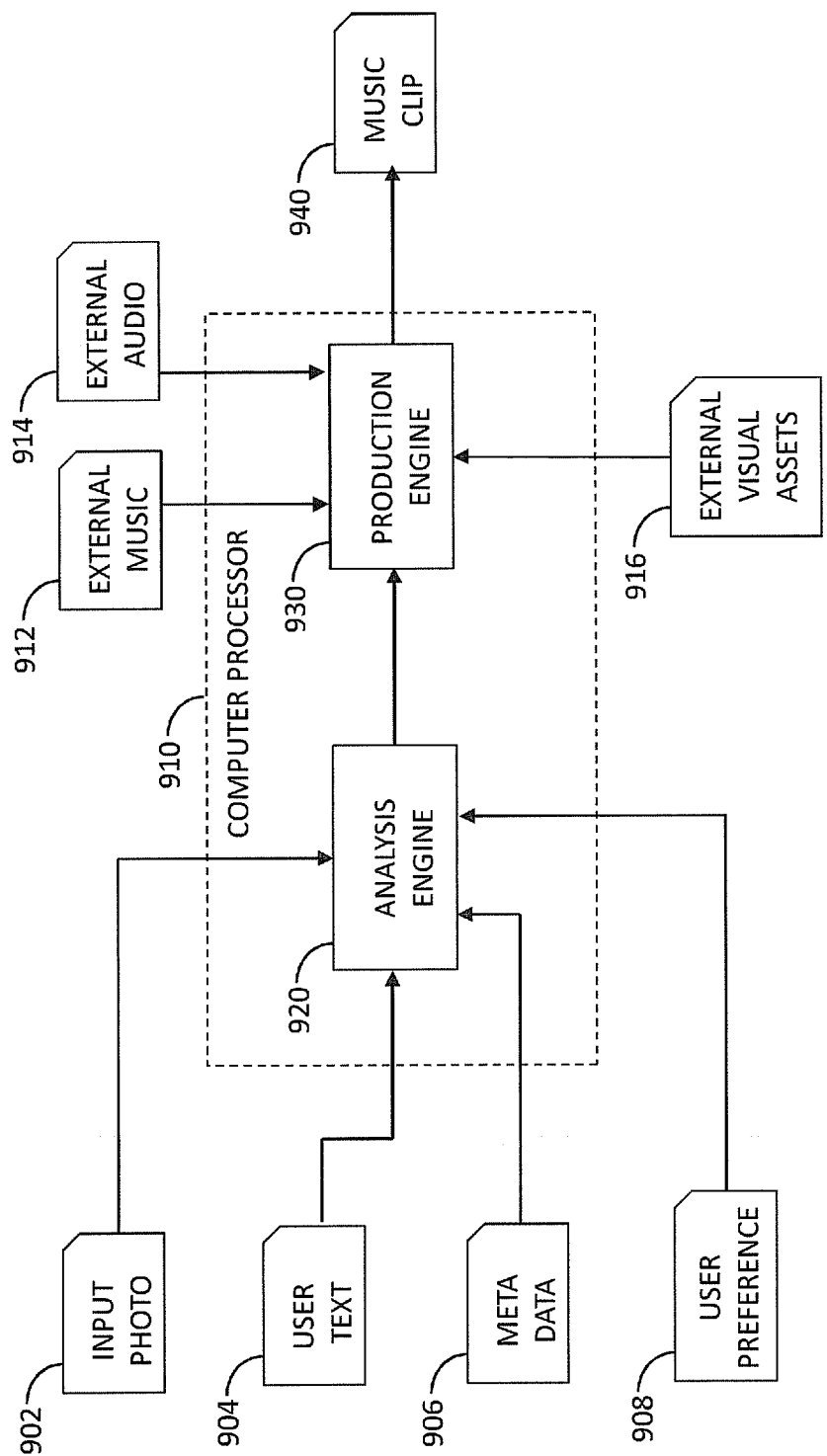
FIG. 9 is a schematic block diagram illustrating a system according to embodiments of the present invention.

FIG. 9 is a block diagram illustrating a block diagram illustrating a schematic flow in accordance with some embodiments of the present invention. The one or more input photos 902, optionally together with additional user text message 904, meta-data 906 and user preferences 908 are inserted into an analysis engine block 920 (possibly executed on computer processor 910), which extracts semantic information such as the scene, important objects in the one or more photos, and the like. Based on the analysis, a music clip 940 is generated from the one or more photos by a production engine (possibly executed on computer processor 910). Additional audio visual assets such as external audio 914, external music 912 or external visual assets 916 may also be added to enrich this clip.

In accordance with embodiments of the present invention, input photo 902 and the user text-message 904, optionally together with some additional meta-data 906 (e.g.—GPS information, time of capture, user gender, and the like) and user preferences 908 (e.g.—desired emotional impact) are inserted into an analysis engine block 920.

The analysis block 920 extracts semantic information about the desired messaging or intention of the user: such as—the scene in which the photo was taken (e.g.—coast, gym, street, school, and the like), objects that appear in the photo (e.g.—people, pets, cars, and the like) and general attributes and layout of the image (colors, texture, segmentation map, and the like).

The text message 904 may also be analyzed, and joined with the visual analysis of the photo to obtain a more accurate semantic description of the user's message. For example—if a woman is detected in the photo doing a kissing-like action, and the user text was "Love you sweetheart", this may indicate that it is a love message from this woman to her partner. If the user added a preference 908 of "Love" to the system, it makes this assumption even more confident.

The meta-data 906 extracted from the analysis is used in the production stage by production engine 930 to produce the moving message. For example—in the case described in the previous paragraph, the production may add an effect of flying-hearts to the movie, or zoom-in to the face of the woman. The production engine also responsible to determining a spatio-temporal arrangement of image portions, based different cropping operations of the image around detected objects or portions thereof.

Additional audio 914 and visual assets 916 may also be added automatically to the produced clip 940 to enrich the moving message, such as sounds or visual assets (e.g.—a map in the case of photo taken in a trip).

Finally, external music 912 may also be added to the produced clip 940, to further boost the emotional impact of the moving message. In this case, the spatio-temporal arrangement of the image portions may be synchronized to the added music.

Analysis Engine

In the analysis engine 920, the input photo 902 is analyzed, optionally using also the attached text message and additional meta-data, such as location information (e.g.—via GPS), time information, camera meta-data, and the like.

The visual analysis may include the following operations:

Detecting objects inside the image, such as: people, pets, inanimate objects, and the like. There is a huge number of publications and research on detection of multiple objects in a single image.

In addition, general information regarding the image can also be extracted such as: the scene in which it was captured (e.g.—sea, forest, gym, play-ground, and the like); the event in which it was taken (e.g.—party, game), the time in day in which it was taken (day, night), and the like. This can be done using various methods known in the art.

If a user's text message is attached, this text may also be analyzed and used together with the image for improving semantic understanding of the message: e.g.—consider the text line "Congratulations for your $8^{th}$ birthday", together with an image of a birthday party with Balloons and a cake. The existence of the word "Birthday" together with the content of the image infers that this is indeed a photo taken during a Birthday party. This information can be used, for example, to assign higher weights to detected objects such as "Balloons" and "Cake", as these objects have high relevancy for a Birthday party. In general, the relation between words and visual tags can be learnt using various methods known in the art.

A simple way to learn these connections is via a co-occurrence matrix of words and use this co-occurrence matrix to match between words in the text and objects detected in the image)

Figure 11:
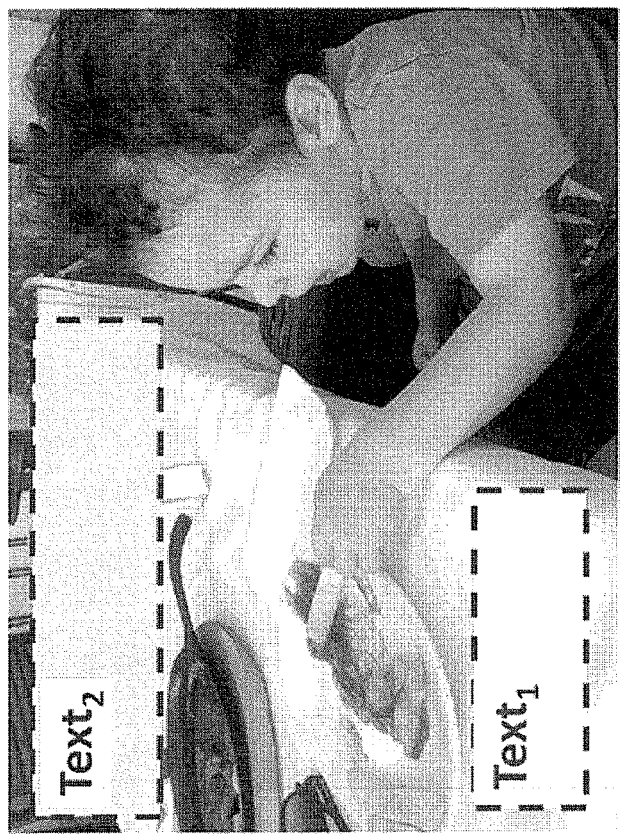
FIG. 11 is an image diagram illustrating an aspect of the system in accordance with embodiments according to the present invention.

Analysis of the photo layout may also be very useful, for example—determining the image "Safe-Zones": locations in which external assets such as an attached text can be overlaid on top of the photo without obscuring important objects. This idea is demonstrated in FIG. 11, where two regions in the image (denoted as $Text_1$ and $Text_2$) are marked as "Safe-Zones"—one is a relatively uniform region (That can be detected, for example, by finding the maximal rectangle for which the sum of gradients is lower than a threshold), and the second is a region that does not include any important object (from a pre-defined set of important objects such as people, pets, and the like). The important objects may be determined automatically from the inferred topic of the message—for example—the topic in FIG. 11 is "A kid eating in a restaurant" in which case, both the kid and the food he is eating are important.

Additional information that can be automatically extracted from the image may also be useful, such as its color & texture distribution, an image segmentation, and the like.

Text analysis may also be used for extracting the topic of the message, or for assigning importance measures to the objects and tags extracted from the image. There is a huge amount of literature on text analysis, automatic topic extraction from text, and the like.

External sources of information and attached meta-data data can also be integrated—e.g. choosing music according to location and meta-data (i.e. we know that user is traveling based on his location), adding production effects of hearts to couples on valentine's day, knowing when it's a person's birthday, and the like.

Production Block

Production block 930 may include the following components:
- Animating the image: The purpose of this component is to stimulate the image, so it will not appear static and dull. This is done by either invoking artificial motion into the image, or using dynamic visual effects.
- Decomposition & Story-Telling: This component is responsible for breaking and composing the image again based on the story to be told by the moving message. The new composition is equivalent to a new spatio-temporal arrangement of photo portions: some may correspond to the background, and other correspond to cropping around objects or part of objects.
- Text animation: In this component, the user's text message is integrated into the moving message.
- Music and Audio: Music is a very effecting tool in stimulating an emotional reaction in people. Thus, a soundtrack is usually added to the movie clip.

Animating the Image

One of the key factors in creating a good moving message is stimulating the image with a dynamic animation so that it will not appear static and dull. This can be done either by simulating an artificial motion from the static image, or by using dynamic visual effects (such effects are common in many video post-production tools such as After-Effects or Nuke). This location and parameters of the effect may be determined by the image content, e.g.—adding a sunset effect added to a photo showing a sunset (this can also depend on the user preferences—e.g.—if the user chose a romantic message) or adding decorations to the non-salient portions of the image. Another simple case of image animation is adding a motion-trajectory to the image.

Figure 10:
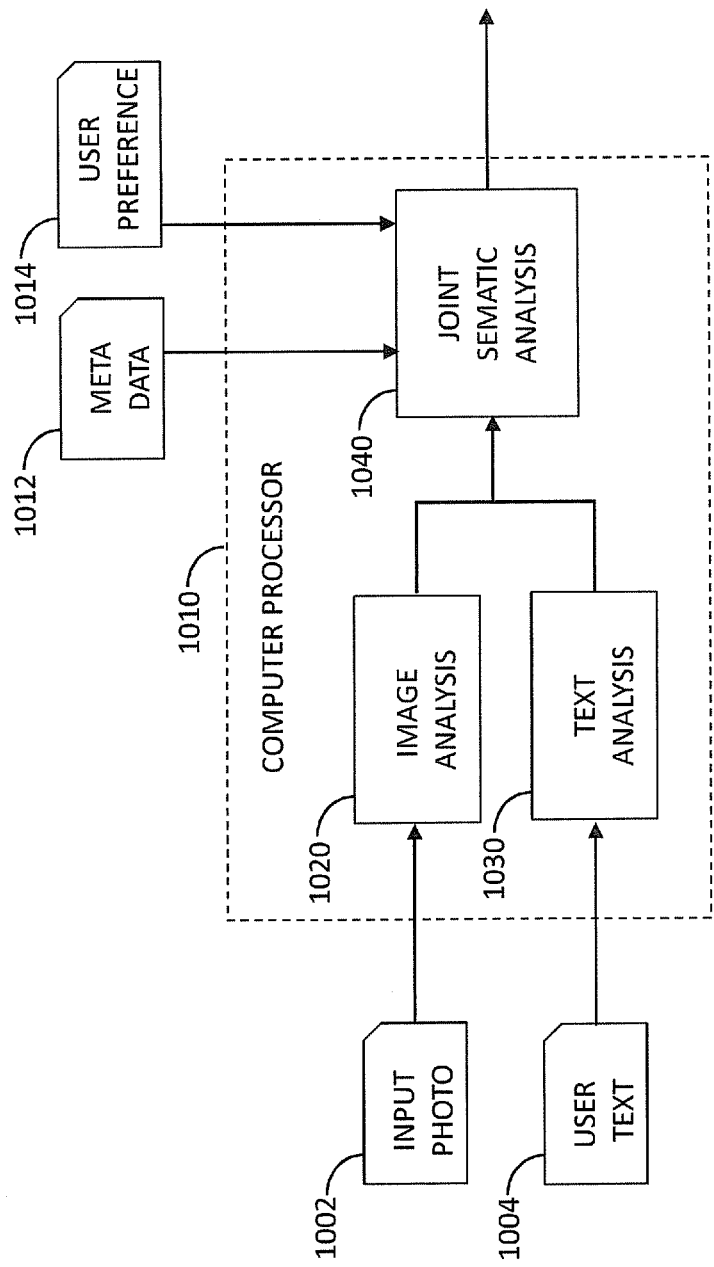
FIG. 10 is a schematic block diagram illustrating a system according to embodiments of the present invention.

FIG. 10 is a block diagram illustrating a block diagram illustrating a slightly different architecture in accordance with some embodiments of the present invention. The input photo 1002 is inserted to image analysis 1020 (carried out by computer processor 1010), user text message 1004 is inserted into an texts engine block 1030 (possibly executed on computer processor 1010), Then the outputs of both image analysis and text analysis are inserted to a joint semantic analysis block 1040 which is fed with meta data 1012 and user preference 1014. The output of the joint semantic analysis is then fed into a production engine (not shown) in a similar manner as discussed, above.

Figure 12:
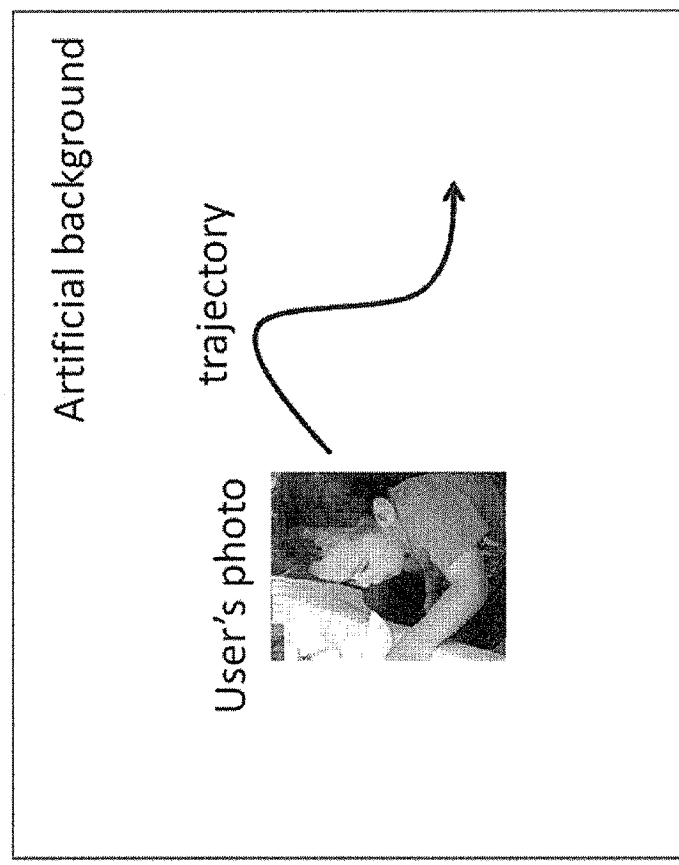
FIG. 12 is an image diagram illustrating another aspect of the system in accordance with embodiments according to the present invention.

FIG. 12 is a diagram illustrating another aspect of the present invention. A simple image animation based on adding a trajectory to the image (or a portion of it), and pasting it on top of an artificial background may be automatically generated.

Decomposition and Story-Telling

This component is responsible for breaking and composing the image again based on the story to be told. In the example shown in FIG. 13, the story of "The kid eating in the restaurant" is being told using three framings ($F_1, \ldots, F_3$) played sequentially in time (optionally having transitions between them): $F_1$: zooming on the kid, $F_2$: zooming on his food, and finally $F_3$: zooming out to show the entire scene. The decision regarding the story being told and thus the decomposition applied on the image is based on the text and image analysis. A very simple decomposition scheme is: (a) Sort the detected objects based on their importance and relevance to the user text message (b) Zoom-in to the $k^{th}$ object with the highest importance measures (k can be 1-3 objects depending on the desired duration of the clip, the desired emotion, and the like) (c) Zoom-out to show the entire image. Various other ordering schemes can also be used.

Figure 13:
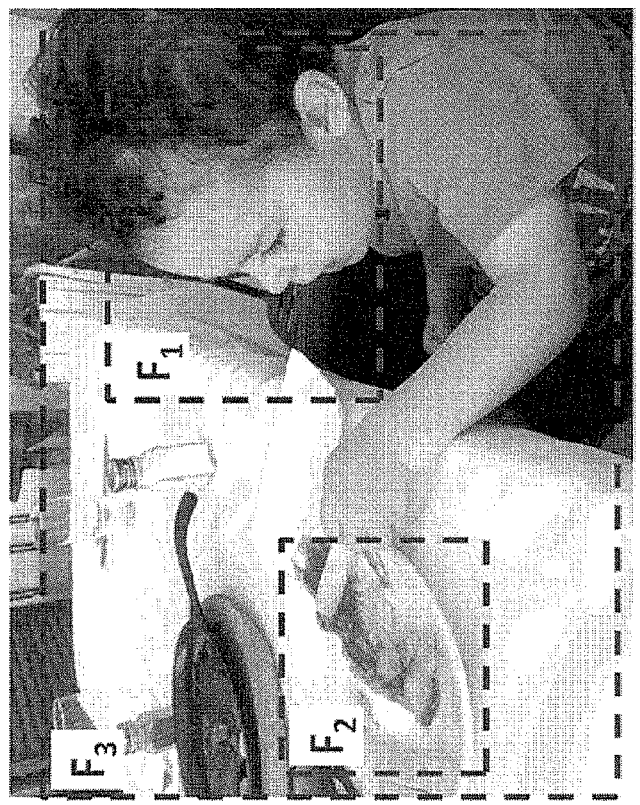
FIG. 13 is an image diagram illustrating yet another aspect of the system in accordance with embodiments according to the present invention.

FIG. 13: Image decomposition and story-telling: In this case, the story of "The kid eating in the restaurant" is being told using three framings ($F_1, \ldots, F_3$) played sequentially in time (optionally having transitions between them): $F_1$: zooming on the kid, $F_2$: zooming on his food, and finally $F_3$: zooming out to show the entire scene.

Text Animation

In some embodiments of the invention, the user attaches the photo with a textual message. This textual message can be used in various ways:
- Assisting in the image understanding (giving more information on the topic and the context in which the image was taken, emphasizing the relevant objects, and the like).
- Help deciding on the editing style that should be used (by giving clues regarding the emotions that should be expressed in the resulting video. e.g.—having the words "Love" may result in using an editing style that is suitable for a romantic messaging.
- It should be noted that photo tags that are associated with the image can be used as a text messaging—either giving additional information on the photo, or even being added to the clip itself as a text layer.
- The text can be added to the resulting music clip as part of the production. Adding a text on top of an image is a common tool in messaging, for example, similar to the very popular "Meme".

Embodiments of the present invention suggest to use the image analysis for the text insertion in various aspects:
- Determining the location of the text message or the text messages. For example—in FIG. 11, the text messages were positioned on top of a relatively uniform area in the image ($Text_1$), and on top of a region that did not contain any important object ($Text_2$). Alternatively, a text message may be located nearby an object if this text refers to this object (e.g.—if the text is a quote, it might be location near a person that was detected in the photo).
- Similar analysis may be used to determine the dynamics of the text boxes, for example—$Text_2$ may enter the clip by flying from the left side, so as not to occlude the face.
- The color of the text may be determined based on the image color: Taking into account (a) Similarity to the background of the relevant text box (it is better to have low similarity) (b) Using dominant colors from the image itself, e.g.—using the color of the boy's shirt for one of the text messages.
- The timing of the appearance of the text messages may be determined based on the story telling. This is part of the story-telling and decomposition mechanism described in the previous sections.
- Obviously, a single text message may be split to multiple text boxes (depending on the length of the text and the size of the text boxes).

Music and Audio

In accordance with embodiments of the present invention, adding music to a clip is very effective in making it more appealing and emotional. The music may be selected by the user, but it may also be automatically selected by the system based on the desired emotional reaction that the moving message should invoke. This may be determined either by the user preferences (selecting an emotion or an "editing style"), or it may be estimated by the text and image analysis. The music selection may also use an additional meta-data (e.g.—if the user is making a clip during the Valentine day, or during the user's birthday). For best production results, the music may be synchronized with the resulting video clip, e.g.—by synchronizing the music beats with the transitions in the clip or with the visual effects.

In addition, external audio assets may automatically be added based on the scene analysis of the photo. For example, if the scene 'Sea' is detected, a soundtrack layer with a sound of waves may be added to the clip, to add more vitality and authenticity to the clip. Another example is adding a sound of a lather if a baby is detected in the picture (and is detected as a central object in the image, or corresponds to the topic of the message). The audio is usually added as an additional layer to the music, but in some cases it may come instead of the music.

Automatically Integrating External Assets

In accordance with embodiments of the present invention, the moving message may be enriched with additional external assets. The integration of audio assets was described in the previous section, but visual assets may also be integrated. Some of them are:
  Adding a map of the location (in case that the photo was taken during a travel, which can be concluded from the GPS information of the user, or from the user preferences).
  Adding photos that are relevant, e.g.—photos of the same event or location (e.g.—a photo of a soccer game may be enriched using other photos from the same game, photos of the team, and the like).
  Adding graphical assets that relates to this photo or to its meta-data—e.g.—a graphical display of the weather that corresponds to the weather and time in which the photo was taken, and the like.

Using Multiple Photos/Multiple Capturing Conditions

Although some of the discussion herein is related to a single photo as an input, it is understood that that embodiments of the present invention can be easy generalized to encompass plurality of still photos (or images). In this case, all photos are analyzed and combined together to form a single story. Multiple photos may also be used to enhance the image analysis, for example, using stereo analysis for extracting depth information.

In accordance with embodiments of the present invention, a special interesting case is using multiple photos taken in small time gaps between them using varying camera settings: for example, flash/no-flash, multiple exposures, multiple focus settings, photo+video, and the like. These multiple photos may be considered as a single photo plus additional information that can be extracted via a joint analysis of the multiple photos (it is assumed that all the photo captures essentially the same scene and event), using methods known in the art.

If applicable, the original audio where the photo was taken may also be useful and can be added as an audio layer to the moving message.

It should be noted that the method according to embodiments of the present invention may be stored as instructions in a computer readable medium to cause processors to perfoim the method. Additionally, the method described in the present disclosure can be stored as instructions in a non-transitory computer readable medium, such as storage devices which may include hard disk drives, solid state drives, flash memories, and the like.

In order to implement the method according to embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   obtaining one or more images containing at least one object over a background;
   detecting at least one object in the one or more images;
   deriving one or more relationships between at least two of: the background, the at least one object, or a portion thereof;
   determining, based on the derived one or more relationships, a spatio-temporal arrangement of at least two of: at least one portion of said one or more images, the at least one detected object, or a portion thereof; and
   producing a clip based on the determined spatio-temporal arrangement.

2. The method according to claim 1, wherein the one or more images is a single still photo.

3. The method according to claim 2, wherein the relationships comprise a calculated score.

4. The method according to claim 2, further comprising obtaining incoming music as an input and synchronizing the spatio-temporal arrangement with the incoming music.

5. The method according to claim 1, further comprising obtaining text as an input, wherein the producing of a clip further includes adding the text to a spatio-temporal location that is based on at least one of: the derived geometric features of the at least one detected object, the one or more derived relationships.

6. The method according to claim 1, further comprising obtaining text as an input and analyzing the obtained text, wherein the determining a spatio-temporal arrangement is further based on the analysis of the obtained text.

7. The method according to claim 1, further comprising obtaining text as an input, wherein the producing of a clip further includes adding the text, wherein the added text is further animated based on at least one of: geometric features of the at least one detected object, or the one or more derived relationships.

8. The method according to claim 1, further comprising obtaining text as an input, and determining a color of the text based on colors represented in the image.

9. The method according to claim 8, wherein the determined color is a color salient in the image.

10. The method according to claim 1, further comprising obtaining text as an input, and determining a location for adding the text onto the one or more images, wherein the location is determined based on saliency analysis of the one or more images.

11. The method according to claim 1, wherein the producing of a clip further comprises automatically adding an audio track which is contextually related to the at least one of: a scene appearing in the background, the at least one detected objects.

12. The method according to claim 2, wherein the producing of a clip further comprises automatically adding at least one external graphical asset which is contextually related to the at least one of: a scene appearing in the background, the at least one detected object, and metadata associated with said image, an input text.

13. The method according to claim 2, wherein the spatio-temporal arrangement further comprises duplicating at least one of the detected objects or portions thereof.

14. The method according to claim 2, wherein the spatio-temporal arrangement further comprises omitting at least one of the detected objects.

15. The method according to claim 2, wherein the determining of the spatio-temporal arrangement comprises cropping the image, substantially around at least one of the detected objects, based on the one or more derived relationships.

16. The method according to claim 2, wherein the determining a spatio-temporal arrangement is further based on meta-data other than the geometrical meta-data of at least some of the detected objects.

17. The method according to claim 2, wherein the production further comprises generating at least one transition between at least two of: at least one portion of said image, the at least one detected object or a portion thereof.

18. The method according to claim 1, wherein the production further comprises generating a music sequence along the sequence of the extracted objects, based at least partially on the one or more derived relationships.

19. The method according to claim 15, wherein the spatio-temporal arrangement results in at least two consecutive selections of the same object undergoing two different cropping operations.

20. The method according to claim 1, wherein the one or more images include at least two objects, wherein the relationship defines an inter-object relationship between the at least two objects.

21. The method according to claim 20, wherein the inter-object relationships comprises at least one of the following relationships: the objects are looking at each other: the objects are within a predefined time-space from each other; the objects are talking to each other; the objects are engaged in a similar activity.

22. The method according to claim 20, wherein the inter-object relationships score is affected positively by a preference for placing two objects close in time in a case said two objects are strongly related.

23. The method according to claim 2, wherein the producing of a clip further comprises automatically adding a visual effect which is contextually related to the at least one of: a scene appearing in the background, the at least one detected object.

24. The method according to claim 1, wherein the producing of a clip further comprises automatically adding an external text which is contextually related to the at least one of: a scene appearing in the background, the at least one detected object, a meta-data attached to the one or more input photos.

25. A system comprising:
a memory configured to store one or more images containing at least one object over a background; and
a computer processor configured to:
detect at least one object in the one or more images;
derive one or more relationships between at least two of: the background, the at least one object, or a portion thereof;
determine, based on the derived one or more relationships, a spatio-temporal arrangement of at least two of: at least one portion of said one or more images, the at least one detected object, or a portion thereof; and
produce a clip based on the determined spatio-temporal arrangement.

26. A non-transitory computer readable medium comprising a set of instructions that when executed cause at least one processor to:
obtain one or more images containing at least one object over a background; and
detect at least one object in the one or more images;
derive one or more relationships between at least two of: the background, the at least one object, or a portion thereof;
determine, based on the derived one or more relationships, a spatio-temporal arrangement of at least two of: at least one portion of said one or more images, the at least one detected object, or a portion thereof; and
produce a clip based on the determined spatio-temporal arrangement.

* * * * *